Figure 1:
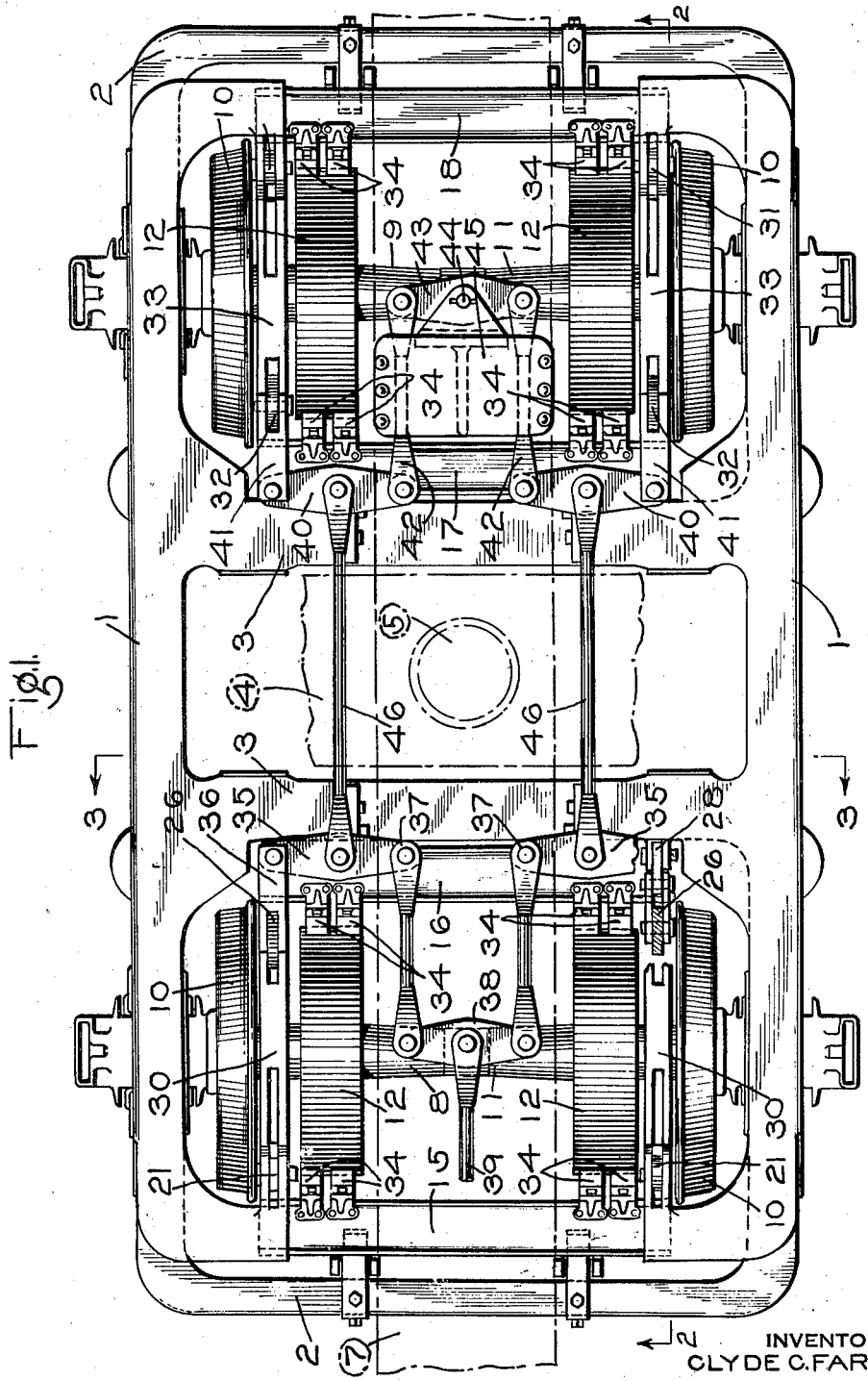

March 26, 1940. C. C. FARMER 2,194,745

DRUM BRAKE

Filed Nov. 19, 1938 2 Sheets-Sheet 1

INVENTOR
CLYDE C. FARMER
BY A. M. Wiggins
ATTORNEY

March 26, 1940.  C. C. FARMER  2,194,745
DRUM BRAKE
Filed Nov. 19, 1938  2 Sheets-Sheet 2
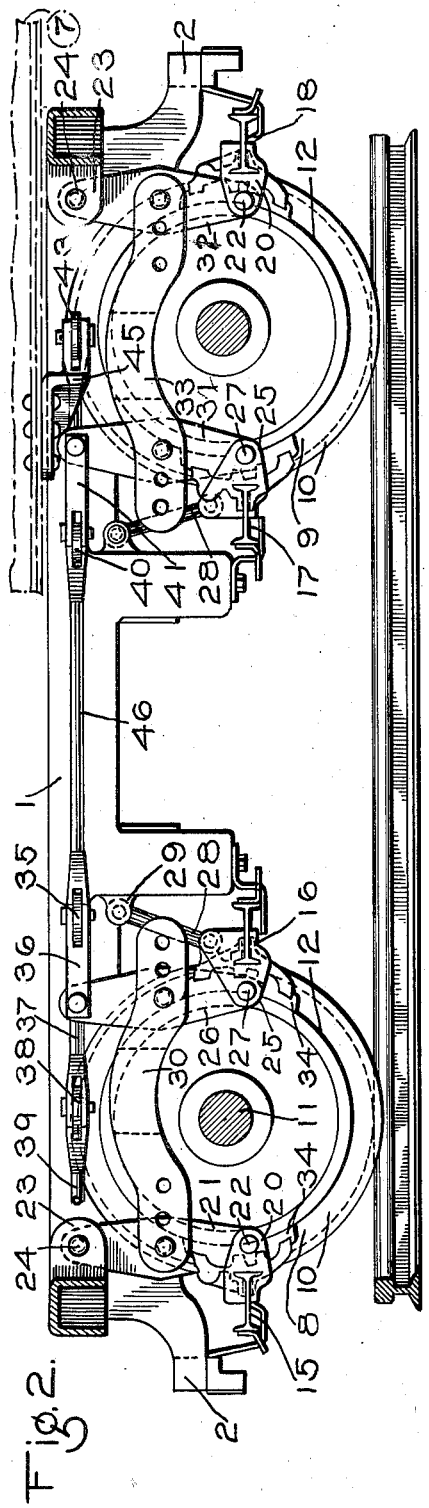
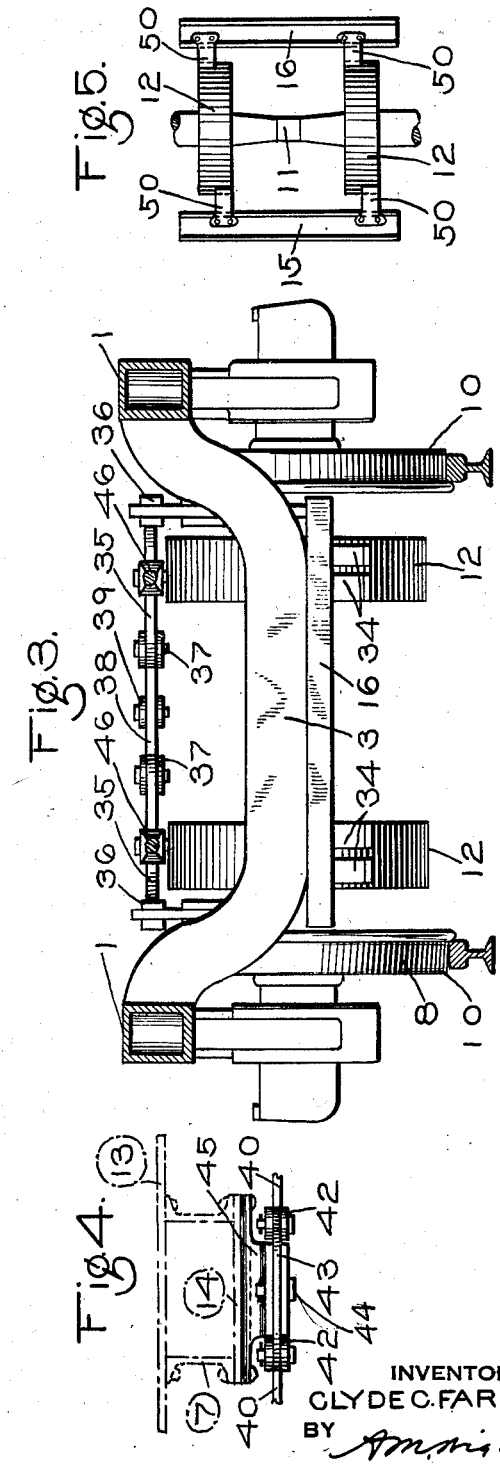
INVENTOR
CLYDE C. FARMER
BY
ATTORNEY Patented Mar. 26, 1940

2,194,745

UNITED STATES PATENT OFFICE 2,194,745

DRUM BRAKE

Clyde C. Farmer, Pittsburgh, Pa., assignor to The Westinghouse Air Brake Company, Wilmerding, Pa., a corporation of Pennsylvania Application November 19, 1938, Serial No. 241,406

16 Claims. (Cl. 188—58)

This invention relates to brake rigging for railway vehicle trucks and more particularly to clasp brake rigging of the drum type in which brake shoes and brake beams are arranged on both sides of a pair of brake drums secured to each wheel and axle assembly of the truck for rotation with the axle.

The principal object of the invention is to provide an improved brake rigging of the above mentioned type having vertically disposed brake beam actuating brake levers arranged between the brake drums and the wheels of the wheel and axle assemblies where they will be well protected against damage by contact with objects such as stones, dirt, timbers or the like lying along the track rails.

Another object of the invention is to provide a brake rigging of the above mentioned type having the brake shoes of less width than the braking surface of the brake drum so arranged on each side of the drum that their frictional braking faces will insure even wear of the braking surface throughout its entire width.

Another object of the invention is to provide a clasp brake rigging of the above mentioned type having the dead end of the rigging fulcrumed to the vehicle body, so as to eliminate as far as possible the tendency of the mechanism to pull the vehicle truck out from under the vehicle body.

Other objects and advantages will appear in the following more detailed description of the invention.

In the accompanying drawings Fig. 1 is a plan view of a railway vehicle truck embodying the invention; Fig. 2 is a longitudinal sectional view of the same taken on the line 2—2 of Fig. 1; Fig. 3 is a transverse sectional view of the same taken on the line 3—3 of Fig. 1; Fig. 4 is a fragmentary end elevational view of a portion of the mechanism and illustrating the manner of fulcruming the dead end of the brake rigging to the center sill of a vehicle; and Fig. 5 is a fragmentary plan view of a modification of the brake shoe arrangement.

As shown in the accompanying drawings the vehicle truck may be of the cast metal type comprising spaced side frames 1 which are integrally connected at their ends by transversely extending end pieces 2, and intermediate their ends by spaced transversely extending transoms 3, the space between the transoms being provided for the accommodation of the usual truck bolster 4 which carries a truck center plate 5 upon which is adapted to rest the usual body center plate which may be secured to the underside of the center sill construction 7 of the vehicle body.

The truck frame may be carried in the usual manner by spaced wheel and axle assemblies 8 and 9. Each of these assemblies comprises laterally spaced wheels 10 which are rigidly secured to an axle 11, and further comprises laterally spaced brake drums 12 which are secured to the axle for rotation therewith and which are arranged one adjacent each wheel, there being sufficient space provided between each drum and the adjacent inner surface of the wheel to accommodate a portion of the brake rigging as will hereinafter more fully appear.

The center sill 7 of the vehicle body may be of any desired construction and for illustrative purposes is shown in dot and dash lines in Fig. 4 as being of the box girder type comprising a pair of spaced longitudinally extending channels which are connected together by top and bottom cover plates 13 and 14, respectively, which are secured to the respective top and bottom flanges of the channels.

The brake rigging comprises transversely extending brake beams 15, 16, 17 and 18 which are located a short distance below the horizontal center lines of the wheel and axle assemblies 8 and 9 and are of less length than the distance between the inner surfaces of each pair of wheels 10 so as to provide clearance spaces between their ends and the wheels.

The brake beams 15 and 16 are arranged one on each side of the assembly 8 and the beams 17 and 18 are arranged one on each side of the assembly 9.

Each end of the brake beam 15 has rigidly secured thereto a bracket having spaced lugs 20 between which the lower end of a vertically disposed hanger lever 21 extends and to which this end of the lever is operatively connected by means of a pin 22. The upper end of the lever extends between spaced lugs 23 which are carried by the truck frame and to which this end of the lever is operatively connected by means of a pin 24.

Each end of the brake beam 16 has rigidly secured thereto a bracket having spaced lugs 25 between which the lower end of a vertically disposed brake lever 26 extends and to which this end of the lever is operatively connected by means of a pin 27. Each end of this brake beam is supported by a hanger 28 which is pivotally connected at its upper end to spaced lugs 29 carried by one of the transoms 3 and which is pivotally connected at its lower end to the lugs 25.

The levers 21 and 26 at each side of the truck are operatively connected to each other intermediate their ends through the medium of a longitudinally extending connector 30 which is located above the axle of the assembly and within the space between a wheel and the adjacent brake drum 12.

The brake beams 17 and 18 associated with the wheel and axle assembly 9 are supported from the truck frame in identically the same manner as the brake beams 15 and 16 and are operatively connected to the same arrangement of brake levers. The same reference characters might be used for both sets of levers but to avoid confusion the hanger levers for the brake beam 18 and the vertically disposed levers for the brake beam 17 are indicated by the reference characters 31 and 32, respectively, while the connectors through the medium which these levers are operatively connected together are each indicated by the reference character 33.

Secured to each brake beam 15, 16, 17 and 18 are two brake elements 34 for frictional braking engagement with the peripheral braking surface of a brake drum which elements are spaced apart longitudinally of the respective beam. The brake elements on the brake beams 15 and 18 are so arranged that when an application of the brakes is being effected they will frictionally engage certain portions of the width of the braking surfaces of the respective brake drums, while the brake elements on the brake beams 16 and 17 are so arranged that they will frictionally engage the remaining portions of the braking surfaces of the drums. In other words the brake elements on each end of the brake beams 15 and 16 and of the brake beams 17 and 18 are arranged in staggered relation to each other. By reason of this arrangement, even wear of the braking surface of each brake drum is insured.

The upper end of each of the vertically disposed levers 26 is operatively connected to the outer end of a horizontally disposed lever 35 through the medium of a longitudinally extending link 36 which lever 35 is operatively connected at its outer end to the inner end of a longitudinally extending pull rod 37. The outer end of this pull rod is operatively connected to one end of a horizontally disposed equalizer lever 38 which is connected intermediate its ends to the inner end of a pull rod 39 through the medium of which braking power is applied to the equalizing lever and thereby to the associated brake rigging parts.

The upper end of each of the vertically disposed brake levers 32 is operatively connected to the outer end of a horizontally disposed lever 40 through the medium of a longitudinally extending link 41, which lever 40 at its opposite end is operatively connected to the inner end of a tension rod 42. The outer end of this tension rod is operatively connected to one end of a horizontally disposed equalizer lever 43 which is fulcrumed intermediate its ends on a vertically disposed pin 44 carried by a fulcrum plate 45 rigidly secured to the underside of the center sill 7 of the vehicle body.

The horizontally disposed levers 35 and 40 at each side of the longitudinal center line of the truck are operatively connected together intermediate their ends by a longitudinally extending tension rod 46.

From the foregoing description it will be seen that there is a system of connected brake levers and rods at each side of the truck for actuating the brake beams 15, 16, 17 and 18 to cause the brake shoes carried thereby to frictionally engage the peripheral braking surfaces of the brake drums 12, and that these systems are operatively connected together at their live ends by the equalizer lever 38 and at their dead ends are operatively connected together by the fulcrum or dead lever 43.

It will also be seen that by fulcruming the dead end of both systems of levers and rods on the center sill of the vehicle body the tendency of the brake rigging to pull the truck frame out from under the vehicle body will be substantially wholly eliminated.

In operation, power applied to the pull rod 39 will cause the equalizer lever 38 to move to the left as viewed in Figs. 1 and 2, thus rotating the horizontally disposed levers 35 about their pivotal connections with the tension rods 45, so as to rotate the vertically disposed brake levers 26 in a clockwise direction about their pivotal connections with the connectors 30. The levers 26 as they are thus actuated move the brake beam 16 and associated brake elements in a direction toward the left hand causing the brake elements to frictionally engage the braking surfaces of the brake drums. When the brake elements engage the brake drums the pins 22 connecting the lower ends of the levers to the brake beam serve as fulcrums for the levers, so that as power continues to be applied to the levers, the levers rock in a clockwise direction about the pins and pull the connectors 30 in a direction toward the right hand, causing the dead levers 21 to rock in a counterclockwise direction about their fulcrum pins 24 and thereby move the brake beam 15 so as to bring the brake elements carried by the beam into frictional braking engagement with the brake drums 12 of the wheel and axle assembly 8.

When the brake elements have thus been moved into braking engagement with opposite sides of the brake drums 12 of the wheel and axle assembly 8, the continued movement of the equalizing lever 38 to the left causes the horizontally disposed levers 35 to rotate about their pivotal connections at their outer ends. These levers as they are thus moved act through the medium of the tension rods 45 to cause the horizontally disposed levers 40 to rotate about their fulcrumed inner ends. The levers 40 as they are thus actuated cause the vertically disposed levers 31 and 32 to operate to move the respective brake beams 18 and 17 toward each other so as to bring the brake elements carried by these beams into frictional braking engagement with the brake drums 12 of the wheel and axle assembly.

*Description of arrangement shown in Fig. 5*

In Fig. 5 a modified brake drum and brake shoe arrangement for one wheel and axle assembly is illustrated in connection with a pair of brake drums 12 and a pair of brake beams such for instance as beams 15 and 16. In this arrangement each end of each brake beam is provided with a single brake shoe 50 instead of with two brake shoes as shown in Figs. 1 to 3. The shoes at the same end of the brake beams 15 and 16 are arranged in staggered relationship with each other longitudinally of the beams and are each of such a width that they will engage the full width of the friction braking face of the respective drum and thereby insure even wear of the face over its full width.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a brake rigging for railway trucks, in combination, a truck frame supporting wheel and axle assembly, a brake drum secured to the axle of said assembly for rotation therewith, said drum being spaced a short distance from a wheel of the assembly, brake elements disposed in clasp arrangement about said brake drum and movable into frictional braking engagement with said drum, a system of levers and rods disposed in the space between said drum and wheel operative for actuating said brake elements, and means for actuating said system of levers and rods.

2. In a brake rigging for railway trucks, in combination, a truck frame supporting wheel and axle assembly, a brake drum secured to the axle of said assembly for rotation therewith, said drum being spaced a short distance from a wheel of the assembly, brake elements disposed in clasp arrangement about said brake drum and movable into frictional braking engagement with said drum, a vertically disposed hanger lever pivotally connected at its upper end to the truck frame and extending into the space between said drum and wheel, said lever being operative to actuate the brake elements at one side of the drum into frictional braking engagement with the drum, a tension member disposed in the space between said drum and wheel and movable longitudinally for actuating said lever, a vertically disposed live lever extending into the space between said drum and wheel and operative to actuate said tension member and to actuate the brake elements at the opposite side of the brake drum into frictional braking engagement with the drum, and means operative to actuate said live lever.

3. In a brake rigging for railway trucks, in combination, a truck frame supporting wheel and axle assembly, a braking surface rotatable with said assembly, a brake element at each of two opposite sides of said braking surface and movable into braking engagement with the braking surface, each brake element being of less width than the braking surface and both elements being arranged in staggered relationship to each other to insure uniform wear of the braking surface over its full width, and means for actuating said brake elements.

4. In a brake rigging for railway trucks, in combination, a truck frame supporting wheel and axle assembly, a braking surface rotatable with said assembly, a brake element at one side of said braking surface and being movable into braking engagement with the braking surface, another brake element at the opposite side of said braking surface and being movable into braking engagement with the braking surface, each brake element being of less width than the drum and both elements being arranged in staggered relationship to each other to insure uniform wear of the braking surface over its full width, and means for actuating the brake elements.

5. In a brake rigging for railway trucks, in combination, a truck frame supporting wheel and axle assembly, a braking surface rotatable with said assembly, a brake element at one side of said braking surface being adapted to frictionally engage a portion of the width of said braking surface, another brake element at the opposite side of said braking surface being adapted to frictionally engage the remaining portion of the width of said braking surface, and means for moving said elements into frictional engagement with said braking surface.

6. In a brake rigging for railway trucks, in combination, a truck frame supporting wheel and axle assembly, a brake drum secured to the axle of said assembly for rotation therewith, a brake beam at each of two opposite sides of said brake drum, a brake element of less width than the braking surface of the drum carried by each brake beam and movable by the beam into braking engagement with said braking surface, the brake element on one brake beam being staggered with relation to the brake element on the other brake beam so that each element engages the portion of the braking surface of the drum not engaged by the other element to insure uniform wear of the braking surface, and means operative to actuate said beams.

7. In a brake rigging for railway trucks, in combination, a truck frame supporting wheel and axle assembly, a brake drum secured to the axle of said assembly for rotation therewith, a brake beam at each of two opposite sides of said brake drum, a plurality of spaced brake elements carried by each brake beam and movable by the beam into braking engagement with the braking surface of the drum, the brake elements on one brake beam being staggered in the direction of the length of the beam with relation to the brake elements on the other brake beam to insure the engagement of the braking surface of the brake drum over its full width, and means for actuating said brake beams.

8. In a brake rigging for railway trucks, in combination, a truck frame supporting wheel and axle assembly, a braking surface rotatable with said assembly, laterally spaced brake elements at each of two opposite sides of said braking surface and movable into braking engagement with the braking surface, the brake elements at one side being staggered laterally of the braking surface with relation to the brake elements at the other side, and means for actuating all of the brake elements.

9. In a brake rigging for railway trucks, in combination, a truck frame supporting wheel and axle assembly, two brake drums secured to the axle of said assembly for rotation therewith, said drums being located between the wheels of the assembly and arranged one adjacent each of said wheels, two brake beams arranged one at each of the opposite sides of the brake drums and extending longitudinally of the assembly, said brake beams terminating at each end short of the adjacent wheel, a pair of brake elements secured to each end portion of each brake beam and adapted to be moved by the beam into braking engagement with the braking surfaces of said brake drums, the brake elements of each pair being spaced apart longitudinally of the respective brake beam and the pairs of brake elements being spaced apart longitudinally of the respective brake beam, the space between the brake elements of each pair on each brake beam being substantially equal and the pairs of elements on one beam being spaced apart a greater distance than the pairs of elements on the other beam, and means for actuating both of said brake beams.

10. In a brake rigging for railway trucks, in combination, a truck frame supporting wheel and axle assembly, two brake drums secured to the axle of said assembly for rotation therewith, said drums being located between the wheels of the assembly and arranged one adjacent each of said wheels, two brake beams arranged one at each of the opposite sides of the brake drums and extending longitudinally of the assembly, said brake beams terminating at each end short of the adjacent wheel, a pair of brake elements secured to each end portion of each brake beam and adapted to be moved by the beam into braking engagement with the braking surfaces of said brake drums, the brake elements of each pair being spaced apart longitudinally of the respective brake beam and the pairs of brake elements being spaced apart longitudinally of the respective brake beam, the space between the brake elements of each pair on each brake beam being substantially equal and the pairs of elements on one beam being spaced apart a greater distance than the pairs of elements on the other beam, and means disposed between each brake drum and the adjacent wheel operative to actuate said brake beams.

11. The combination of a brake drum having a peripheral braking surface, a brake element located at one side of the drum and being of less width than said braking surface, another brake element located at the opposite side of the drum and being of less width than said braking surface, said brake elements being movable into braking engagement with the said braking surface and being staggered with relation to each other laterally of the braking surface to insure uniform wear of the braking surface for its full width.

12. The combination of a brake drum having a peripheral braking surface, a plurality of spaced brake elements located at one side of said drum and movable into braking engagement with said braking surface for a portion of its width and a plurality of spaced brake elements located at the opposite side of said drum and movable into braking engagement with said braking surface, for the portions of its width not engaged by the first mentioned braking elements.

13. The combination of a brake drum having a peripheral braking surface, and a pair of spaced brake elements at each of opposite sides of said drum and movable into braking engagement with said braking surface, said pairs of brake elements being offset from each other laterally of the drum to insure engagement by one of said pairs of elements of the portions of the drum not engaged by the other of said pairs of elements.

14. In a brake rigging for railway vehicle trucks having a plurality of supporting wheel and axle assemblies, a pair of brake drums secured to the axle of each assembly, brake elements operative into frictional braking engagement with opposite sides of said drums, brake beams for actuating said elements, two sets of operatively connected levers and rods for actuating said brake beams and arranged one set at each side of the longitudinal center line of the truck, a floating equalizer power lever located at one side of the transverse center line of the truck and operatively connected to said sets, an equalizer dead lever fulcrumed at the other side of the transverse center line of the truck to the body of the vehicle and operatively connected to said sets, and means for actuating said floating lever.

15. In a brake rigging for railway vehicle trucks having a plurality of supporting wheel and axle assemblies, a pair of brake drums secured to the axle of each assembly, brake elements operative into frictional braking engagement with opposite sides of said drums, brake beams for actuating said elements, two sets of operatively connected levers and rods for actuating said brake beams and arranged one set at each side of the longitudinal center lines of the truck, a floating equalizer power lever located at one side of the transverse center line of the truck and operatively connected to said sets, an equalizer dead lever fulcrumed at the other side of the transverse center line of the truck to the body of the vehicle and operatively connected to said sets, and means for actuating said floating lever, all of the rods of each of said sets being tension rods.

16. In a brake rigging for railway vehicle trucks having a plurality of supporting wheel and axle assemblies, a pair of brake drums secured to the axle of each assembly, brake elements operative into frictional braking engagement with opposite sides of said drums, means for actuating said elements, two sets of operatively connected levers and rods for actuating said means and arranged one set at each side of the longitudinal center line of the truck, a power applying lever located at one side of the transverse center line of the truck and operatively connected to said sets, a lever located at the other side of the transverse center line of the truck fulcrumed intermediate its ends to a relatively fixed part of the vehicle and operatively connected at each of its ends to one of said sets, and means for actuating said power applying lever.

CLYDE C. FARMER.